(12) United States Patent  
Lin et al.

(10) Patent No.: US 9,197,839 B2  
(45) Date of Patent: Nov. 24, 2015

(54) DISPLAY DEVICE WITH FRONT-FACING CONCEALABLE INTERFACES

(71) Applicant: ShenZhen Goldsun Network Intelligence Technology Co., Ltd., ShenZhen (CN)

(72) Inventors: Wen-Chin Lin, New Taipei (TW); Ching-Jou Chen, New Taipei (TW); Tzu-Li Liu, New Taipei (TW); Wen-Chieh Wang, New Taipei (TW); Sheng-Tien Chang, New Taipei (TW); Chin-Ming Chen, New Taipei (TW)

(73) Assignee: ShenZhen Goldsun Network Intelligence Technology Co., Ltd., ShenZhen (CN)

( * ) Notice: Subject to any disclaimer, the term of this patent is extended or adjusted under 35 U.S.C. 154(b) by 251 days.

(21) Appl. No.: 13/901,593

(22) Filed: May 24, 2013

(65) Prior Publication Data

US 2014/0328010 A1  Nov. 6, 2014

(30) Foreign Application Priority Data

May 6, 2013 (TW) .............................. 102116035 A

(51) Int. Cl.  
 *H04N 5/64* (2006.01)  
 *G06F 1/16* (2006.01)

(52) U.S. Cl.  
 CPC ................ *H04N 5/64* (2013.01); *G06F 1/1613* (2013.01)

(58) Field of Classification Search  
 CPC combination set(s) only.  
 See application file for complete search history.

(56) References Cited

U.S. PATENT DOCUMENTS

| | | | |
|---|---|---|---|
| 5,474,372 A * | 12/1995 | Jung ............................... 312/7.2 |
| 5,623,393 A * | 4/1997 | Yau ........................... 361/679.21 |
| 5,625,533 A * | 4/1997 | Kim et al. ................. 361/679.21 |
| 5,938,457 A * | 8/1999 | Oh et al. ....................... 439/131 |
| 6,330,041 B1 * | 12/2001 | Park .............................. 348/836 |
| 6,344,968 B2 * | 2/2002 | Kim et al. ................. 361/679.22 |
| 6,766,402 B1 * | 7/2004 | Agata et al. ................... 710/302 |
| 7,217,144 B1 * | 5/2007 | Cipolla et al. ................ 439/131 |
| 7,384,155 B2 * | 6/2008 | Seki ................................. 353/60 |
| 8,681,484 B2 * | 3/2014 | Onodera .................. 361/679.01 |
| 2006/0240704 A1 * | 10/2006 | Corbett et al. ................ 439/502 |
| 2007/0155203 A1 * | 7/2007 | Shabtai et al. ................ 439/131 |
| 2008/0103637 A1 * | 5/2008 | Bliven et al. ...................... 701/1 |
| 2009/0273705 A1 * | 11/2009 | Matsumoto et al. .......... 348/383 |
| 2010/0053874 A1 * | 3/2010 | Yukawa et al. .......... 361/679.21 |
| 2010/0271771 A1 * | 10/2010 | Wu et al. .................. 361/679.17 |
| 2011/0261519 A1 * | 10/2011 | Chiu et al. ................ 361/679.02 |
| 2012/0028485 A1 * | 2/2012 | Liu ................................ 439/142 |
| 2012/0063079 A1 * | 3/2012 | Yeh ............................ 361/679.4 |
| 2012/0188691 A1 * | 7/2012 | Zhou ........................ 361/679.01 |

* cited by examiner

*Primary Examiner* — Lisa Lea Edmonds  
(74) *Attorney, Agent, or Firm* — Novak Druce Connolly Bove + Quigg LLP

(57) ABSTRACT

A display device includes a casing, a display unit received in a front of the casing, and a connector assembly which can be rotated to be front-facing, for plugging in ancillary devices, and the connector assembly can be rotated back to hide the plugs of the ancillary devices and be hidden itself behind a front cover, to preserve the aesthetic appeal of the display device.

5 Claims, 5 Drawing Sheets

DISPLAY DEVICE WITH FRONT-FACING CONCEALABLE INTERFACES

BACKGROUND

1. Technical Field

The present disclosure relates to display devices and, particularly, to a display device with a front-facing concealable interfaces.

2. Description of Related Art

Conventionally, a display device includes a casing defining a plurality of interfaces in a rear of the casing for connecting a plurality of connectors. However, the rear of the casing may be mounted to a wall, so it is inconvenient to plug or unplug the connectors.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean "at least one."

Figure 1:
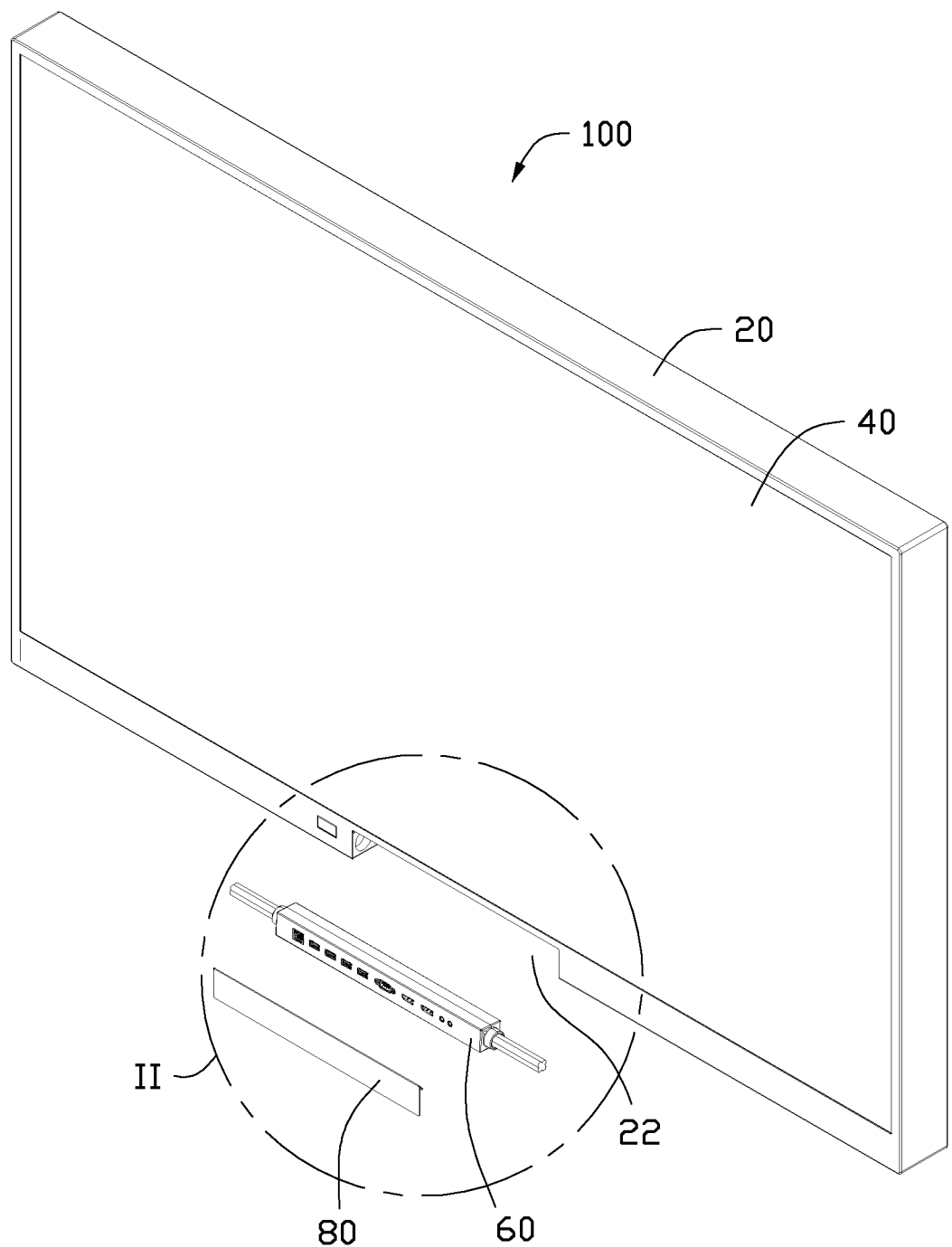
FIG. 1 is an exploded, isometric view of an embodiment of a display device.
Figure 2:
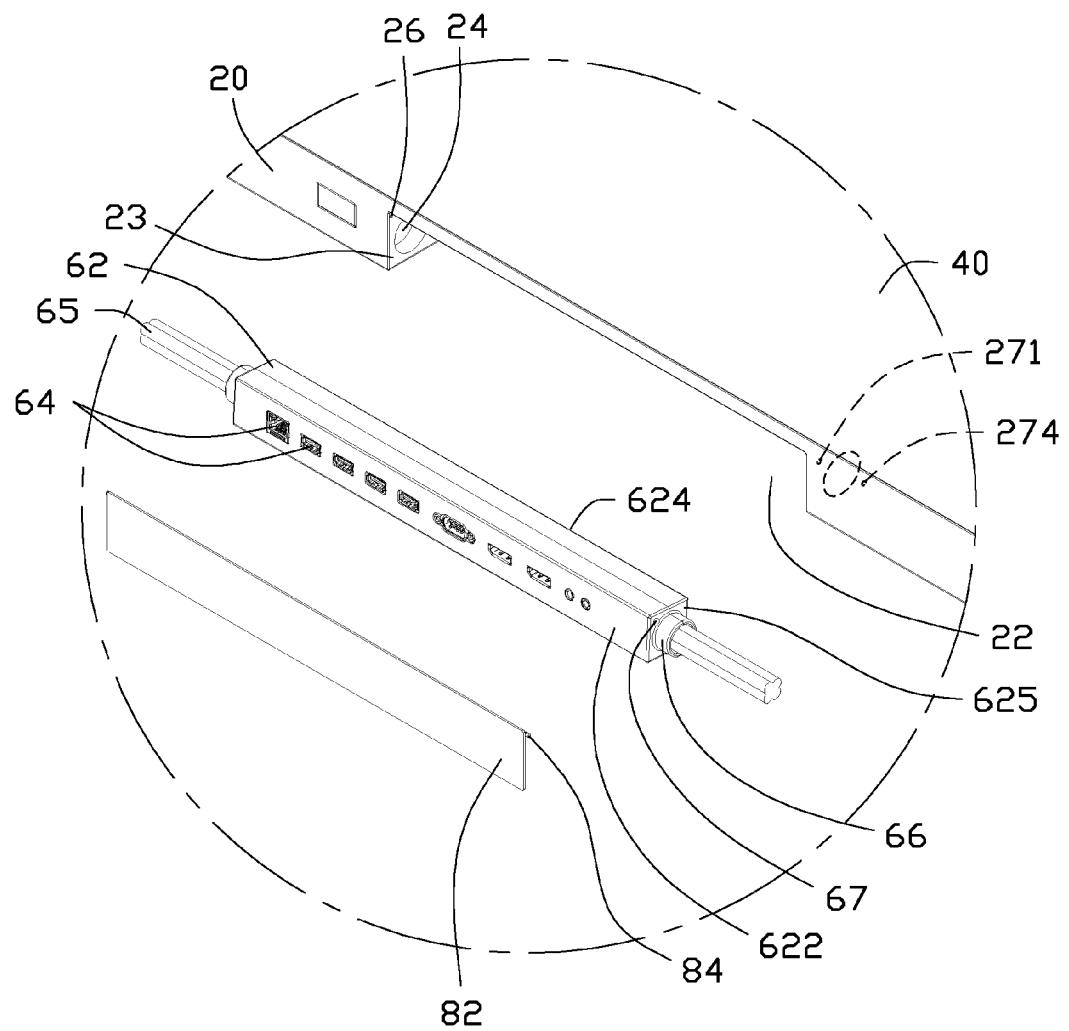
FIG. 2 is an enlarged view of circled portion II of FIG. 1.

FIGS. 1 and 2 show an embodiment of a display device 100. The display device 100 includes a casing 20, a display unit 40 mounted to the casing 20, a connector assembly 60, and a cover 80.

A bottom of a front surface of the casing 20 defines a cutout 22. The casing 20 defines two opposing pivot holes 24 in two end walls 23 bounding the cutout 22, and two opposing rotation holes 26 in front portions of top sides of the end walls 23. One of the end walls 23 defines a first positioning hole 271 and a second positioning hole 274 on either side of the pivot hole 24.

The connector assembly 60 includes a rectangular rotating shell 62, a plurality of interfaces 64, and a plurality of cables 65. The rotating shell 62 includes a front plate 622, a rear plate 624 opposite to the front plate 622, and two opposite end plates 625 connected between ends of the front plate 622 and the rear plate 624. Two opposing connecting rings 66 perpendicularly extend out from the end plates 625. A resilient nub 67 protrudes out from a front corner of one of the end plates 625. The nub 67 is hemispherical. The interfaces 64 are defined in the front plate 622 of the rotating shell 62, and arrayed lengthwise along the front plate 622. The cables 65 extend through the connecting rings 66, to be electrically connected to the interfaces 64.

The cover 80 includes a protecting plate 82 and two opposing shafts 84 extending out from two ends of a top side of the protecting plate 82.

Figure 3:
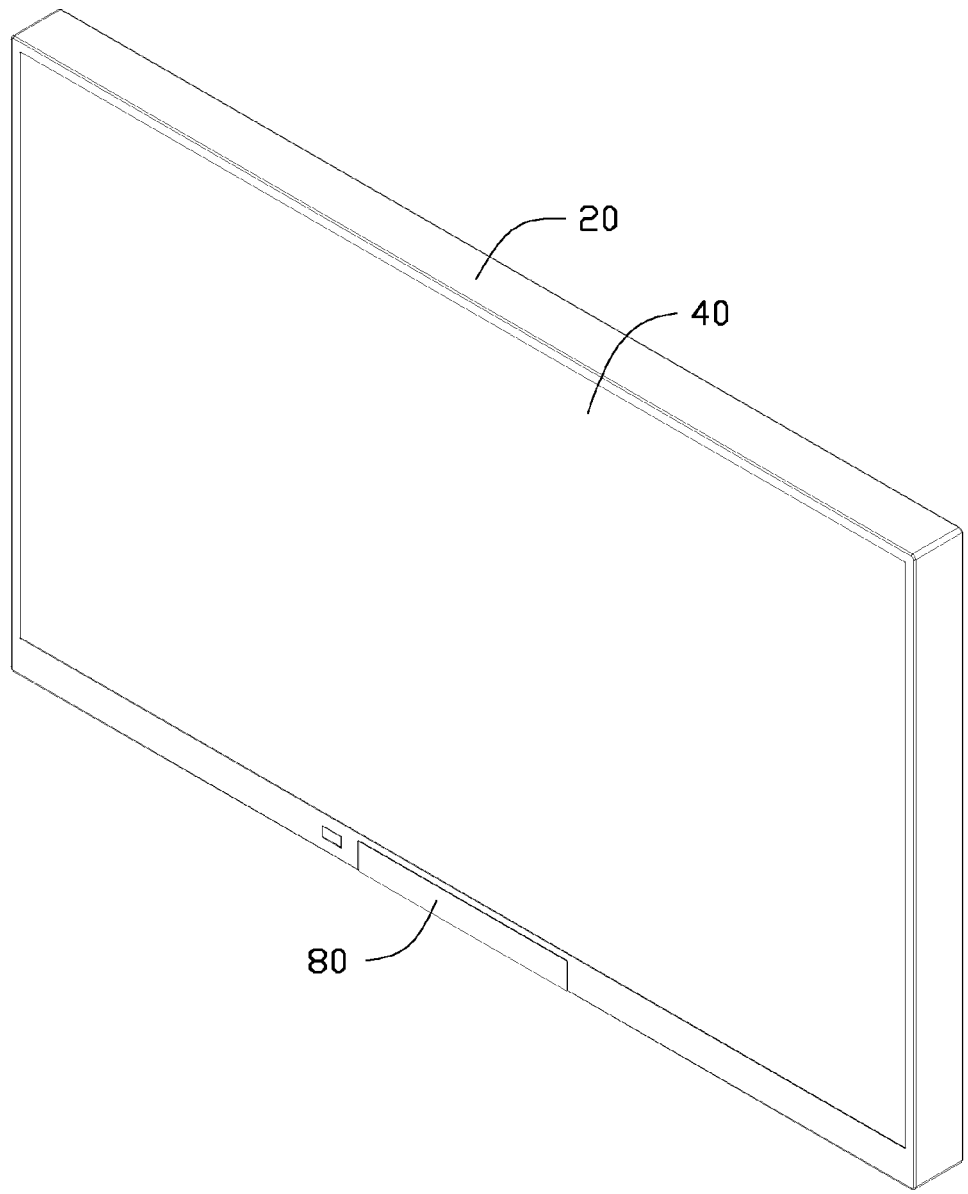
FIG. 3 is an assembled, isometric view of the display device of FIG. 1.

FIG. 3 shows that, in assembly, the connector assembly 60 is received in the cutout 22 of the casing 20, with the nub 67 aligning with the end wall 23 in which the first and the second positioning holes 271 and 274 of the casing 20 are defined. The cables 65 extend through the pivot holes 24 of the casing 20 to be connected to electronic elements in the casing 20, and the connecting rings 66 are rotatably received into the pivot holes 24. Thereby, the connector assembly 60 is rotataby received in the cutout 22. When the nub 67 latches in the first positioning hole 271, the interfaces 64 are oriented to be at the front surface of the casing 20 and facing outwards; when the nub 67 latches in the second positioning hole 274, the interfaces 64 are oriented so as to be retracted in the casing 20 and facing the wall. The cover 80 is received in the cutout 22, and the shafts 84 of the cover 80 are rotatably inserted into the rotation holes 26. Thereby, the cover 80 is rotatably received in the cutout 22, and the cover 80 covers the connector assembly 60 to be coplanar with the front surface of the casing 20.

Figure 4:
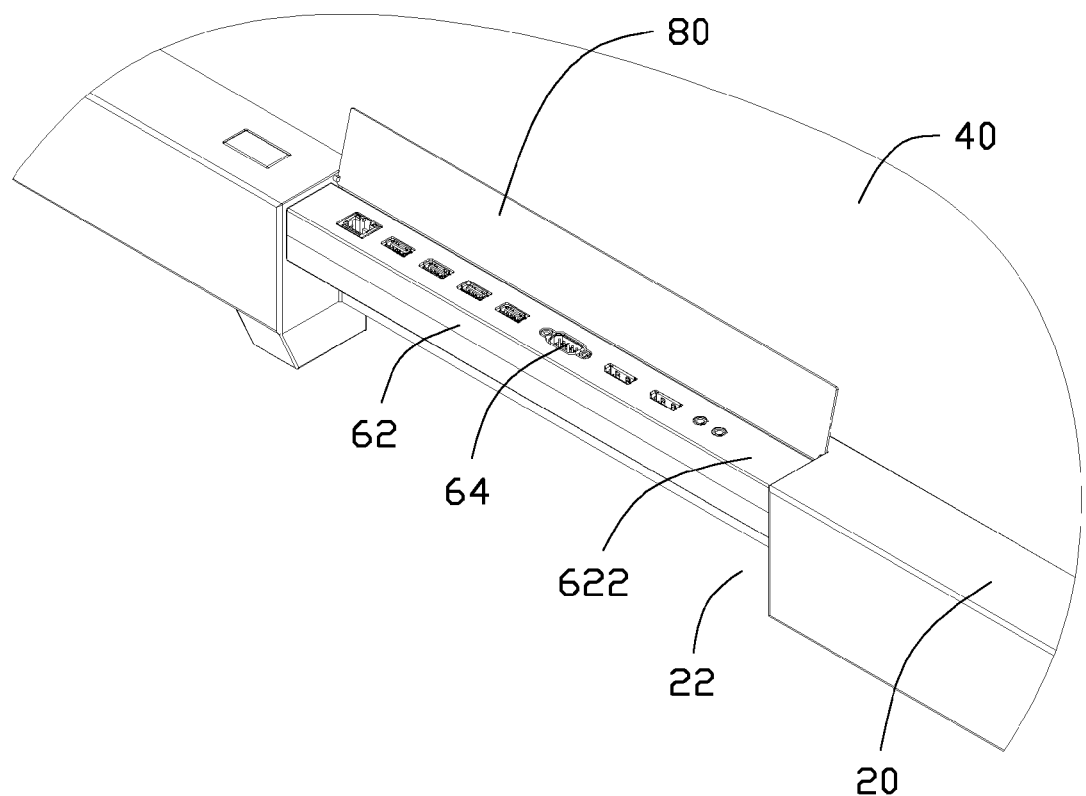
FIG. 4 is a partially enlarged view of the display device of FIG. 3.
Figure 5:
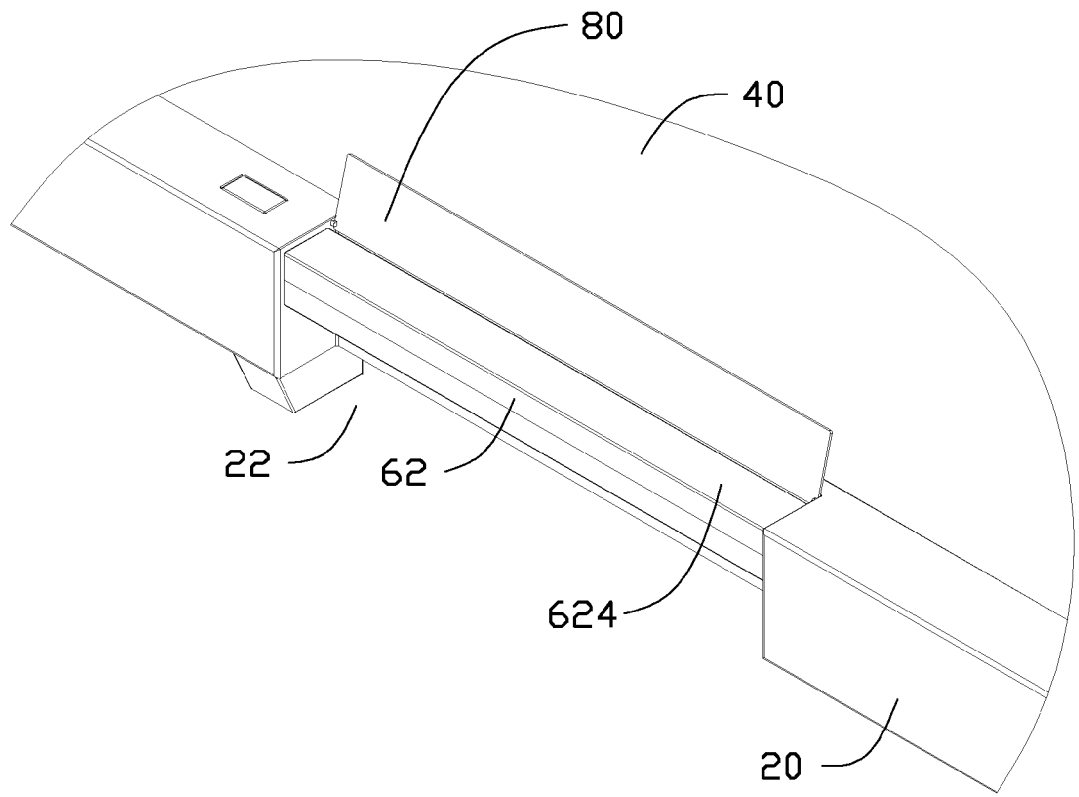
FIG. 5 is similar to FIG. 4, but showing a different state of use.

FIGS. 4 and 5 show that, in use, the display device 100 is installed on a wall (not shown). The cover 80 is rotated away from the connector assembly 60, the connector assembly 60 is rotated forward, and the connecting rings 66 rotate in the pivot holes 24. The nub 67 abuts against the end wall 23, deforming the nub 67, until the nub 67 aligns and latches with the first positioning hole 271. Thereby, the interfaces 64 are located at the front surface of the casing 20, as shown in FIG. 4, so it is convenient to plug or unplug connectors to or from the interfaces 64 of the casing 20. Then the connector assembly 60 can be rotated rearward, to deform the nub 67, until the nub 67 is disengaged from the first positioning hole 271. The nub 67 slides against the end wall 23, until the nub 67 aligns and latches with the second position hole 274. Thereby, the connectors (not shown) plugged into the interfaces 64 are located at the rear surface of the casing 20, as shown in FIG. 5. The cover 80 is restored to cover the connector assembly 60.

While the disclosure describes examples and embodiments, it is to be understood that the disclosure is not limited thereto. On the contrary, the disclosure is intended to cover such various modifications and similar arrangements as would be apparent to those skilled in the art. Therefore, the scope of the appended claims should be accorded the broadest interpretation so as to encompass all such modifications and similar arrangements.

What is claimed is:

1. A display device, comprising:

a casing defining a cutout in a bottom of a front surface of the casing;

a display unit received in the casing; and a connector assembly comprising a rotating shell rotatably received in the cutout of the casing, and a plurality of interfaces mounted to the rotating shell;

wherein the casing defines two opposing pivot holes in two end walls bounding the cutout, two opposing connecting rings protrude out from the rotating shell, to be rotatably received in the pivot holes of the casing;

wherein the rotating shell comprises a front plate, a rear plate opposite to the front plate, and two opposite end plates connected between the front plate and the rear plate, the connecting rings extend out from the end plates, the plurality of interfaces is arrayed lengthwise along the front plate;

wherein one of the end walls of the casing defines a first positioning hole and a second positioning hole on either side pivot hole, a nub protrudes out from one of the end plates of the rotating shell adjacent to the first positioning hole and the second positioning hole, when the nub latches in the first positioning hole, the plurality of interfaces is oriented to be at the front surface of the casing and facing outwards, when the nub latches in the second positioning hole, the plurality of interfaces is oriented so as to be retracted in the casing and facing the inwards.

2. The display device of claim 1, wherein the nub is hemispherical.

3. The display device of claim 1, wherein the connector assembly further comprises a plurality of cables extending through the connecting rings and electrically connected to the interfaces.

4. The display device of claim 1, further comprising a cover rotatably received in the cutout, the cover is coplanar with the front surface of the connector assembly when it covers the connector assembly.

5. The display device of claim 4, wherein the end walls of the casing define two opposite rotation holes, the cover comprises a protecting plate and two opposite shafts protruding out from a top side of the protecting plate, the shafts are rotatably received in the pivot holes of the casing.

* * * * *